United States Patent [19]

Milani et al.

[11] Patent Number: 4,624,992

[45] Date of Patent: Nov. 25, 1986

[54] PROCESS FOR GRAFTING UNSATURATED MONOMERS ON OLEFINIC POLYMERS

[75] Inventors: Federico Milani, S. Maria Maddalena; Marco Binaghi, Milan, both of Italy

[73] Assignee: Ausimont S.p.A., Milan, Italy

[21] Appl. No.: 816,445

[22] Filed: Jan. 6, 1986

[30] Foreign Application Priority Data

Jan. 8, 1985 [IT] Italy ................. 19049 A/85

[51] Int. Cl.$^4$ .................. C08F 255/02; C08F 255/04; C08F 255/06

[52] U.S. Cl. ..................................... 525/257; 525/258; 525/266; 525/244; 525/319; 525/322; 525/324; 525/289; 525/290

[58] Field of Search ........................................ 525/257

[56] References Cited

U.S. PATENT DOCUMENTS 2,947,718 8/1960 Rugg et al. .................. 525/257
3,876,730 4/1975 Morimoto et al. .................. 525/232
3,928,497 12/1975 Ohmori et al. .................. 525/285
3,953,541 4/1976 Fuji .................. 525/285

FOREIGN PATENT DOCUMENTS 876535 9/1961 United Kingdom .

Primary Examiner—Carman J. Seccuro

[57] ABSTRACT

Ethylenically unsaturated monomers are grafted on homo- and olefinic co-polymers by means of a radicalic reaction, operating at between 60° C. and 160° C., in a solution of the polymer in a solving medium consisting of, or predominantly comprising a mixture of a component (A), chosen between aliphatic hydrocarbons, aromatic hydrocarbons, esters and ethers containing at least one aromatic or cycloaliphatic group, with a component (B) consisting of an aliphatic, cycloaliphatic or aromatic ketone, and by separating at the end of the reaction the grafted polymer, by means of the cooling down of the solution to a temperature below 40° C.

2 Claims, No Drawings

PROCESS FOR GRAFTING UNSATURATED MONOMERS ON OLEFINIC POLYMERS

BACKGROUND OF THE INVENTION

The grafting of ethylenically unsaturated monomers on olefinic polymers, inclusive of the polyolefinic elastomers, in the presence of radicalic starters or initiators has been amply described in the literature. In this respect there may be cited: U.S. Pat. Nos. 3,177,269 and 4,010,223, British Pat. Nos. 852,042, 853,970, 905,043, 917,048, 972,229 and Belgian Pat. No. 558,004.

The grafting techniques used for the purpose differ from one another for the different physical state of the polymer to be grafted, wherefore we may have either processes in bulk, in solution or in suspension.

In the first case, the polymer and the unsaturated monomer are mixed together in the presence of free radical-generating compounds, at a temperature (in general comprised between 150° and 180° C.) which renders the material workable in extruders, mixers, etc.

However simple, this method is substantially little convenient because of the difficulty to control the operational conditions, especially when the olefinic polymer is rubbery.

The method in solution operates with the polymer dissolved in a solvent, usually an aromatic hydrocarbon, in the presence of the monomer to be grafted and of the other reactants, at temperatures greater than 70° C., under stirring, for reaction times sufficient for getting high conversion rates. Such a method offers different advantages, amongst others the possibility of a thermal control; however, it is limited above all by the necessity to separate and recycle considerable quantities of solvent and non-solvent (coagulant) used for precipitating the grafted polymer from the solution.

The suspension-grafting method is realized by suspending, in general in water, the granulated polymer possibly blown with solvents, together with the monomer, the initiator or starter and a surfactant, and by then letting the mixture react at a temperature comprised between 60° C. and 100° C.

The suspension method offers the advantages of allowing to operate at high polymer concentrations and to separate the grafted polymer by means of simply filtering and centrifuging.

This method is not suited, however, for the grafting of monomers that are easily hydrolizeable in water, like maleic anhydride. Moreover, the grafting of the monomer takes place completely on the external surface of the polymeric granule and, thus, on the whole, with poor grafting yields on the total quantity of polymer used.

THE PRESENT INVENTION

The applicant has now found a process for the grafting of ethylenically unsaturated monomers by a radical way on homo- and olefinic copolymers, a process that allows to obtain contemporaneously both the advantages of the methods operating in solution as well as in suspension, without suffering from the corresponding drawbacks. In fact, this process allows to eliminate the use of coagulants for the polymer, while at the same time obtaining the polymer itself in an easily filtrable and washable particulated form, besides showing only a low content of residual solvents; and, lastly, it allows to exploit the full capacity of the reactor.

Said process consists in reacting, in the presence of radicalic initiators and at temperatures comprised between 60° C. and 160° C., a solution of the polymer and of at least one ethylenically unsaturated monomer, in a solving medium consisting of, or prevailingly formed by a mixture between component (A), chosen from amongst aliphatic hydrocarbons, aromatic hydrocarbons, the esters containing at least one aromatic or cycloaliphatic group, and ethers containing at least one aromatic or cycloaliphatic group, and compound (B) consisting of a ketone of the aliphatic, cycloaliphatic or aromatic type, and by then separating the grafted polymer from such a solution by cooling down said solution.

The mixture of above said components (A) and (B) must form a homogeneous solution, at least under the reaction conditions, and in its turn should be a solvent for the polymer and the unsaturated monomers under these conditions, and a non-solvent of the polymer at a temperature below 40° C., and preferably lower than 30° C.

As aliphatic hydrocarbons usable for such a purpose may be listed the linear, branched or cyclic aliphatic hydrocarbons containing from 6 to 10 carbon atoms or the linear, branched or cyclic hydrocarbons containing halogen atoms, with from 2 to 10 carbon atoms.

Examples of such hydrocarbons are: butane, n-hexane, n-heptane, n-octane, cyclohexane, isobutane, pentane, dichloroethane, trichloroethylene, octyl-chloride, cyclohexyl-chloride and bromide, tetrabromoethane, dichlorooctane, decaline and the mixtures of them with each other.

The utilizable aromatic hydrocarbons contain from 6 to 16 carbon atoms, and they may possibly be halogenized. More particularly, there are cited: benzene, toluene, xylene, chlorobenzene, dichlorotoluene, ethylbenzene, bromoxylene, naphthalene, tetrahydronaphthalene, anthracene, chloronaphathlene, and the mixtures thereof.

Examples of usable ethers and esters are represented by: diphenylether, anisol, benzyl acetate, ethyl benzoate, benzyl benzoate, cyclohexyl acetate. Utilizable ketones preferably contain in their chain or in the group containing the ketonic function, from 3 to 20 carbon atoms, and possibly may contain, as substituents, ether, ester, aminic or acidic groups having tertiary nitrogen atoms, halogens.

Examples of such ketones are: dimethylketone, methylethyl ketone, methyl-cyclohexyl ketone, methyl-isobutylketone, cyclohexanone, cyclopentanone, methyl-isopropyl ketone, acetophenone, benzophenone, anisyl-methylketone, p-dimethylaminophenyl-methylketone, methyl aceto-acetate, p.chlorophenylmethylketone.

Preferably the mixture between components (A) and (B) consists of 4 to 7 parts by volume of component (B) per one part by volume of component (A).

However, depending on the type of components (A) and (B) used, as well as on the reaction temperature, said limits are susceptible to suffer considerable variations.

The olefinic polymers usable for the process of the present invention are those obtained by the polymerization of the monomers of the general formula;

(wherein R=either hydrogen or an alkyl containing from 1 to 6 carbon atoms) or by the copolymerization of mixtures of such monomers.

Examples of homopolymers are: polyethylene, polypropylene, polybutane, poly-4-methyl-1-pentene, polyhexene, polyoctene.

Examples of copolymers are given by the ethylene/propylene copolymers (EPM), possibly comprising minor quantities of a third monomer consisting of a conjugated or a non-conjugated diene (EPDM terpolymer); besides by the copolymers of ethylene with butene-1, hexene-1, octene-1, or by the copolymers of propylene with butene-1, hexene-1, 4-methylpentene-1; or by the terpolymers ethylene/propylene/hexene-1, besides the so-called co- and terpolymers possibly containing double bonds coming from conjugated or non-conjugated dienes used in the course of the polymerization.

The respective quantities of monomers in such copolymers are not critical; they may in fact vary within very wide intervals, without any prejudice to the possibility of using the polymers themselves in the process of this invention.

For instance, the elastomeric EPM and EPDM copolymers that may be used for the purposes of the present invention, in general consist of: from 30% to 80% by weight of ethylene and from 0% to 15% by weight of a termonomer consisting of a conjugated or a non-conjugated diene.

Examples of such a diene are: ethylidenenorbornene, 1,4-hexadiene, dicyclopentadiene, butadiene.

The quantity of polymer to be used in the reaction is not critical. It is, however, advisable that the concentration in copolymer be such as to give place to a viscosity of the solution, at temperatures comprised between 60° C. and 160° C., that be not greater than 200 poise.

Preferably one operates at copolymer concentrations in the solution that are comprised between 12% and 18% by weight.

The radicalic initiator to be used may be of the type that is commonly used in this type of reaction; more particularly there may be used either a peroxide or an azo-compound or any other substance capable of providing radicals at the reaction. One may also operate in the presence of chain-transferers, for instance, mercaptanes, chlorinated compounds, etc.

The quantity of radicalic initiator to be used in the reaction, may vary within a very wide range of ratios, also depending on the polymer to be grafted. For example, it varies in ratio from 0.05 to 1 mol per mol of unsaturated monomer in the case of EPM copolymers, and from 0.01 to 0.2 mols per mol of unsaturated monomer in the case of EPDM terpolymers.

Examples of unsaturated monomers may be grafted by means of the method of the present invention, are: maleic anhydride, fumaric acid, maleic acid, (met) acrylic acid, glycidyl (met) acrylate, besides the substitution derivatives of such compounds with aminic, amidic, immidic groups, besides the mixture of all these compounds with each other, and possibly with styrene.

Said monomers may be used in quantities of from 0.1% to 20% by weight on the polymer.

The treatment by which, at the completion of the reaction, the grafted polymer (as well as the one that had not reacted) is separated from the solution, consists in lowering the temperature of the solution down to values below 30° C.

After filtering or centrifuging of the polymer, the mixture of solvents, possibly still containing unconverted unsaturated monomer, may be re-utilized for a new reaction cycle.

The following examples will further illustrate the method of the present invention, without however representing in any way a limitation of the scope of this invention.

The grafted products obtained according to said examples, have been characterized through I.R. analysis in order to determine the presence and quantity of grafted monomer, while the performance or the grafted product in improving the shock-resistance of the polar polymers were evaluated on the basis of the IZOD measurement on the mixtures of said grafted products with NYLON 6.

The examples that follow have no limiting purposes whatsoever. EXAMPLE 1

Into a reactor provided with a stirrer, and with suitable feeding devices, there were introduced 350 g of ethylene/propylene copolymer containing 50% in mols of ethylene and having a Mooney ML (1+4) viscosity at 100° C.=40, together with 2000 cc of a mixture consisting of 1 volume of toluene and 5 volumes of methylisobutylketone.

Under a nitrogen atmosphere, the mixture was subjected to constant stirring at a temperature of 100° C., thereby obtaining a homogeneous solution. Thereupon there were introduced 15 grams of maleic anhydride dissolved in 200 cc of the same mixture of toluene and methylisobutylketone, and finally into the reactor were introduced 100 cc of a solution of 10 g of benzoylperoxide in 200 cc of the above said mixture. This mixture was made to react for 60 minutes at 100° C. under stirring, contemporaneously feeding into the reactor, during this period, further 100 cc of benzoylperoxide solution. The solution was then allowed to react for further 30 minutes, whereupon the solution was cooled down to 20° C., obtaining thereby the separation of the polymer in a finely particulated form. The polymer was then filtered and washed in acetone.

The quantity of polymer thus obtained amounted to about 360 g, while the content in toluene in the polymer was less than 50 ppm.

Under I.R. analysis, the quantity of maleic anhydride grafted onto the polymer turned out to be 4.2% b.w.

One portion of the polymer was incorporated into a polyamide (NYLON 6, commercially named SNIAMID ASN27/PS—produced by SNIA S.p.A.) passing it through WERNER double-screw extruders, thereby obtaining a homogeneous mix at 25% of said polymer.

On a test sample of said mix there were carried out determinations on the impact-resistence by means of the CHARPY method, with an ASTM-S256 indent, getting the following results:

at 20° C.=70 KJ/$m^2$
at 0° C.=78 KJ/$m^2$
at −23° C.=50 KJ/$m^2$

In comparison with these above data, the polyamide as such, under the same testing conditions, showed an impact-resitance at 20° C. of 7 KJ/$m^2$.

EXAMPLE 2

It was operated following the same procedures as in example 1, using as an olefinic polymer an ethylene/propylene copolymer at 30% in propylene, and with a Mooney viscosity at 100° C.=80.

The grafted rubber proved to contain, under I.R. analysis, 2% of maleic anhydride. Said rubber was mixed in an extruder with NYLON 6, in a weight ratio of 1:3. The mix showed the following impact-resitance values, according to the CHARPY indent test method: at 20° C.=108 KJ/m$^2$; at 0° C.=110 KJ/m$^2$; at −23° C.=84.1 KJ/m$^2$.

EXAMPLE 3

Following the same procedures as those of example 1, an ethylene/propylene/ethylidennorbornene terpolymer containing 32% by weight of propylene and 4% by weight of ethylidenenorbornene, and having a Mooney viscosity at a temperature of 100° C.=70, was grafted with maleic anhydride, using as a catalyst 2.5 g of benzoyl peroxide, and by then adding to the rubber solution 5 g of dodecylmercaptane as a 'transfer' agent. There was obtained a grafted product with a 1.3% of maleic anhydride.

EXAMPLE 4

Example 1 was repeated, but using a azobis-isobutyronitrile (5 g) catalyst. There was obtained a grafted product with a 1.5% of maleic anhydride, which, admixed to NYLON 6 in a weight ratio of 1:3, at the impact-resistance test (Charpy method) gave the following values:
at 20° C.=76 KJ/m$^2$; at 0° C.=55 KJ/m$^2$ and at −23° C.=30 KJ/m$^2$.

EXAMPLE 5

Example 1 was again repeated, but using as a solvent a 1:1 in volume mixture of toluene and methylethylketone, and by operating at 85° C. Thereby was obtained a grafted product containing 4.2% of maleic anhydride.

EXAMPLE 6

Example 1 was repeated, but using as a solvent a 1:1 in volume mixture of toluene and acetone, while operating at 120° C. and under an autogenous pressure. Thereby was obtained a grafted product containing 1.6% of maleic anhydride.

EXAMPLE 7

Example 1 was repeated, but using as a monomer to be grafted, 15 g of glycidylmethacrylate. There was obtained a polymer containing 0.5% of grafted monomer.

EXAMPLE 8

Example 1 was repeated, but using as a monomer a mixture of 20 g of styrene and 15 g of maleic anhydride. Thereby was obtained a grafted product containing 4.2% of maleic anhydride and about 5% of styrene. In admixture with NYLON 6, in a weight ratio of 1:3, said mix yielded the following impact-resistance values (according to the Charpy indent test):
at 20° C.=77 KJ/m$^2$; at 0° C.=89 KJ/m$^2$ and at −23° C.=58 KJ/m$^2$.

EXAMPLE 9

Example 1 was repeated, but using as a solvent a n.heptane/methyl-isopropylketone mixture in a by volume ratio of 1:1.5. Thereby was obtained a rubber containing 1% of grafted maleic anhydride.

EXAMPLE 10

Example 1 was repeated, but using as a solvent a mixture of toluene and cyclohexanone in a by volume ratio of 1:1. The grafted product contained 3.3% of maleic anhydride and, in admixture with NYLON 6 in a weight ratio of 1:3, yielded impact-strength values (by Charpy indent test method) of respectively:
at 20° C.=77 KJ/m$^2$; at 0° C.=89 KJ/m$^2$; at −23° C.=58 KJ/m$^2$.

What we claim is:

1. Process for the grafting of ethylenically unsaturated monomers on olefine homopolymers or copolymers by means of a radical initiator reaction, characterized in that the reaction is achieved at temperatures comprised between 60° and 160° C., maintaining the olefinic polymer dissolved in a solvent consisting essentially of a homogeneous solution a component (A) chosen from the group consisting of aliphatic and aromatic hydrocarbons, ethers and esters containing at least one aromatic or cycloaliphatic group, and a component (B) consisting of either an aliphatic, cycloaliphatic or aromatic ketone, and in that the polymer thus grafted is separated from the solution by cooling down said solution to a temperature below 40° C., said solution of (A) and (B) being a non-solvent for the grafted polymer at a temperature below 40° C.

2. Process according to claim 1, characterized in that the olefine polymer is selected from the group consisting of polypropylene, polyethylene and an ethylene/propylene/(diene) copolymer.

* * * * *